US007472732B2

(12) United States Patent
Otsuji et al.

(10) Patent No.: US 7,472,732 B2
(45) Date of Patent: Jan. 6, 2009

(54) RUBBER COMPOSITION AND COMPETITION TIRE USING THE SAME

(75) Inventors: Hideki Otsuji, Kobe (JP); Shuichi Sakamoto, Kobe (JP); Akihiro Mine, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 503 days.

(21) Appl. No.: 10/960,081

(22) Filed: Oct. 8, 2004

(65) Prior Publication Data

US 2005/0096424 A1 May 5, 2005

(30) Foreign Application Priority Data

Nov. 4, 2003 (JP) ............................ 2003-374624

(51) Int. Cl.
*B60C 3/04* (2006.01)

(52) U.S. Cl. .................... 152/454; 152/209.1; 524/492; 524/493; 524/495; 524/575

(58) Field of Classification Search ................. 524/492, 524/493, 495; 152/209.1, 454
See application file for complete search history.

(56) References Cited

U.S. PATENT DOCUMENTS 5,100,637 A * 3/1992 Nakai ..................... 423/445 R
5,393,821 A * 2/1995 Shieh et al. ................. 524/495
6,376,593 B1 4/2002 Sasaka et al.
6,758,251 B2 * 7/2004 Bates et al. ................. 152/450
7,048,023 B2 * 5/2006 Herberger et al. ........... 152/450
7,096,903 B2 * 8/2006 Weydert et al. .......... 152/209.1
7,193,004 B2 * 3/2007 Weydert et al. ............. 524/424

FOREIGN PATENT DOCUMENTS

JP 2002-60549 A 2/2002

OTHER PUBLICATIONS

JP-A-2002-332381 Abstract Only.
JP-A-11-209518 Abstract Only.
JP-A-11-209517 Abstract Only.
JP-A-8-333484 Abstract Only.

* cited by examiner

*Primary Examiner*—Bernard Lipman
(74) *Attorney, Agent, or Firm*—Birch, Stewart, Kolasch & Birch, LLP

(57) ABSTRACT

The present invention provides a rubber composition, which has improved gripping performance that is required in a competition tire, high hardness and high stiffness. Specifically, the present invention provides a rubber composition comprising 10 to 100 parts by weight of carbon black having nitrogen-adsorbing specific surface area of 160 to 300 $m^2/g$, and 15 to 70 parts by weight of an oil, based on 100 parts by weight of a rubber component comprising 20 to 95% by weight of a styrene butadiene copolymer rubber having styrene content of at least 30% and vinyl content of at least 30% and 5 to 80% by weight of butadiene rubber, and silica in an amount of 20 to 100% by weight of the carbon black; wherein the total amount of the carbon black and the silica is 20 to 120 parts by weight.

6 Claims, No Drawings

RUBBER COMPOSITION AND COMPETITION TIRE USING THE SAME

This Nonprovisional application claims priority under 35 U.S.C. § 119(a) on Patent Application No(s). 2003-374624 filed in Japan on Nov. 4, 2003, the entire contents of which are hereby incorporated by reference.

BACKGROUND OF THE INVENTION

The present invention relates to a rubber composition and a competition tire using the same.

Tires for motocross competition have blocks that are at least 2 cm high and in order to sufficiently exhibit a pattern effect, the hardness of the rubber must be high. Therefore, rubber compositions for motocross tires contain a small amount of process oil and a large amount of carbon black.

In the conventional composition, the gripping performance until the temperature increase of the tire due to external work is stabilized (initial grip) and the gripping performance in low temperatures are sacrificed. Particularly, on short circuits specially set up inside stadiums, performance when starting is important and improvement of initial grip is demanded.

For example, JP-A-8-333484, JP-A-11-209517, JP-A-11-209518 and JP-A-2002-332381 disclose technology for improving steering stability, rolling resistance, abrasion resistance and wet skid performance of a tire. However, such technology, which is directed to tires of passenger cars, is problematic in that the energy loss at a relatively high temperature range of 30 to 100° C., which is necessary for exhibiting the high gripping performance required in competition tires, is small, for the reason that the amount of vinyl in SBR obtained by solution polymerization is small. Consequently, the above technology does not provide satisfactory gripping performance for competition tires.

The present invention aims to provide a rubber composition, which has improved gripping performance that is required in a competition tire, high hardness and high stiffness.

SUMMARY OF THE INVENTION

The present invention relates to a rubber composition comprising 10 to 100 parts by weight of carbon black having nitrogen-adsorbing specific surface area of 160 to 300 $m^2/g$, and 15 to 70 parts by weight of an oil, based on 100 parts by weight of a rubber component comprising 20 to 95% by weight of a styrene butadiene copolymer rubber having styrene content of at least 30% and vinyl content of at least 30% and 5 to 80% by weight of butadiene rubber, and silica in an amount of 20 to 100% by weight of the carbon black; wherein the total amount of the carbon black and the silica is 20 to 120 parts by weight.

The hardness of the rubber composition is preferably 65 to 85, the complex elastic modulus is preferably 5.0 to 25.0 and the tangent loss is preferably 0.25 to 0.45.

The present invention also relates to a competition tire comprising the rubber composition.

DETAILED DESCRIPTION

The rubber composition of the present invention comprises a rubber component containing styrene butadiene copolymer rubber (SBR) and butadiene rubber (BR), carbon black, silica and oil.

The rubber component used in the present invention comprises SBR and BR. When necessary, a rubber selected from natural rubber (NR), isoprene rubber (IR), ethylene propylene diene rubber (EPDM), chloroprene rubber (CR) and acrylonitrile butadiene rubber (NBR) can also be included.

The rubber component of the present invention contains 20 to 95% by weight of SBR. The lower limit of the content of SBR is preferably 40% by weight, more preferably 50% by weight. The upper limit of the content of SBR is preferably 95% by weight, more preferably 90% by weight. When the content of SBR is less than 20% by weight, gripping performance decreases largely, due to temperature increase caused by heat generation, which occurs from continuous running. When the content is more than 95% by weight, flexibility of the rubber is lost and initial gripping performance decreases.

The styrene content of SBR is at least 30%. The lower limit of the styrene content is preferably 35% and the upper limit of the styrene content is preferably 50%, more preferably 45%. When the styrene content is less than 30%, the energy loss that contributes to gripping performance does not reach the necessary level and when the styrene content is more than 50%, the rubber becomes resin-like and flexibility, which is a property of rubber, tends to be lost.

The vinyl content of SBR is at least 30%. The lower limit of the vinyl content is preferably 35%, more preferably 40%. The upper limit of the vinyl content is preferably 75%, more preferably 70%. When the vinyl content is less than 30%, flexibility of the rubber tends to be lost and when the vinyl content is more than 75%, strength tends to decrease.

The rubber component of the present invention contains 5 to 80% by weight of BR. The upper limit of the content of BR is preferably 40% by weight, more preferably 30% by weight. When content of BR is less than 5% by weight, tearing of the blocks, which is a phenomenon that accompanies a tire having high blocks, tends to occur frequently. When the content of BR is more than 80% by weight, the energy loss that contributes to gripping performance does not reach the necessary level.

The carbon black used in the present invention is not particularly limited and examples are HAF, ISAF, SAF, GPF and FEF. Specifically, carbon black having nitrogen-adsorbing specific surface area ($N_2SA$) of 160 to 300 $m^2/g$ is used. The lower limit of $N_2SA$ is preferably 170 $m^2/g$. The upper limit of $N_2SA$ is preferably 250 $m^2/g$, more preferably 220 $m^2/g$. When $N_2SA$ is less than 160 $m^2/g$, the desired rubber strength is difficult to obtain. When $N_2SA$ is more than 300 $m^2/g$, gripping performance under low temperatures and initial grip tend to be lost, as the hardness of the rubber under low temperatures becomes higher than necessary and flexibility of the rubber is lost.

The amount of carbon black in the rubber composition is 10 to 100 parts by weight. The lower limit of the amount of carbon black is preferably 50 parts by weight, more preferably 60 parts by weight. The upper limit of the amount of carbon black is preferably 90 parts by weight, more preferably 80 parts by weight. When the amount of carbon black is less than 10 parts by weight, the reinforcing effect of carbon black is low and abrasion resistance is lost. When the amount is more than 100 parts by weight, the rubber becomes harder than necessary and flexibility of the rubber and gripping performance tend to be lost.

The cetyltrimethylammonium bromide (CTAB) adsorbing specific surface area of the carbon black is preferably 120 to 300 $m^2/g$. The lower limit of CTAB-adsorbing specific surface area is more preferably 150 $m^2/g$ and the upper limit of CTAB-adsorbing specific surface area is more preferably 200 $m^2/g$. When CTAB-adsorbing specific surface area is less than 120 $m^2/g$, the reinforcing effect of carbon black is low and abrasion resistance is lost. When CTAB-adsorbing specific surface area is more than 300 $m^2/g$, the rubber becomes harder than necessary and flexibility of the rubber and gripping performance tend to be lost.

Furthermore, the compressed dibutyl phthalate oil absorption (24M4DBP) of carbon black is preferably 90 to 130 ml/100 g. The lower limit of 24M4DBP is more preferably 100 ml/100 g and the upper limit of 24M4DBP is more preferably 115 ml/100 g. When 24M4DBP is less than 90 ml/100 g, the reinforcing effect of carbon black is low and abrasion resistance tends to be lost. When 24M4DBP is more than 130 ml/100 g, the rubber becomes harder than necessary and flexibility of the rubber and gripping performance tend to be lost.

The type of silica used in the present invention is not particularly limited and examples are dry silica (silicic anhydride) and wet silica (precipitated silica).

The content of silica in the rubber composition is 20 to 100% by weight of the amount of carbon black. The upper limit of the amount of silica is preferably 70% by weight, more preferably 50% by weight. When the amount of silica is less than 20% by weight of the carbon black, initial gripping performance is not significantly improved and when the amount is more than 100% by weight, abrasion resistance is lost.

As the silica, silica having BET specific surface area of 80 to 270 $m^2/g$ can be contained. The lower limit of BET specific surface area is preferably 100 $m^2/g$ and the upper limit of BET specific surface area is preferably 220 $m^2/g$. When the BET specific surface area of the silica is less than 80 $m^2/g$, the reinforcing effect of silica is small and abrasion resistance tends to be lost. When the BET specific surface area of the silica is more than 270 $m^2/g$, the silica has difficulty dispersing in the rubber and the rubber cannot exhibit satisfactory performance.

The rubber composition of the present invention can contain a silane coupling agent together with silica.

Examples of the silane coupling agent are bis(triethoxysilylpropyl)tetrasulfide, bis(triethoxysilylpropyl)disulfide, triethoxysilylpropylisocyanate, vinyl triethoxysilane, vinyl trimethoxysilane, γ-methacryloxypropyltrimethoxysilane, γ-methacryloxypropylmethyldimethoxysilane, γ-glycidoxypropylmethyldiethoxysilane, γ-mercaptopropyltrimethoxysilane, γ-(polyethyleneamino)-propyltrimethoxysilane, N-β-(aminoethyl)-γ-aminopropyltrimethoxysilane and N'-vinylbenzyl-N-trimethoxysilylpropylethylene diamine salt. Of these, bis(triethoxysilylpropyl)tetrasulfide, bis(triethoxysilylpropyl)disulfide, triethoxysilylpropylisocyanate and γ-mercaptopropyltrimethoxysilane are preferable and bis (triethoxysilylpropyl)disulfide is more preferable.

The amount of the silane coupling agent is preferably 5 to 15% by weight of the amount of silica. The lower limit of the amount of the silane coupling agent is preferably 8% by weight and the upper limit of the amount of the silane coupling agent is preferably 10% by weight. When the amount of the silane coupling agent is less than 5% by weight, the coupling effect between the silica and the rubber is weak and abrasion resistance tends to decrease.

The total amount of carbon black and silica in the rubber composition of the present invention is 20 to 120 parts by weight based on 100 parts by weight of the rubber component. The lower limit of the total amount of carbon black and silica is preferably 50 parts by weight, more preferably 70 parts by weight. The upper limit of the total amount of carbon black and silica is preferably 110 parts by weight. When then total amount is less than 20 parts by weight, abrasion resistance decreases and when the amount is more than 120 parts by weight, gripping performance decreases, as the rubber becomes harder than necessary and flexibility of the rubber is lost.

The oil that is used in the present invention can be any material that is usually considered to be a softening agent, such as aromatic oil, naphthene oil, paraffin oil and a plasticizer (for example, an ester-type, an ether-type and an phosphoric acid-type).

The amount of oil in the rubber composition is 15 to 70 parts by weight based on 100 parts by weight of the rubber component. The lower limit of the amount of oil is preferably 30 parts by weight, more preferably 35 parts by weight. The upper limit of the amount of oil is preferably 60 parts by weight, more preferably 55 parts by weight. When the amount of oil is less than 15 parts by weight, gripping performance decreases, as the rubber becomes harder than necessary and flexibility of the rubber is lost. When the amount is more than 70 parts by weight, gripping performance decreases, due to abrasion caused by decrease in rubber strength and collapse of pattern blocks caused by decrease in hardness.

Examples of the vulcanization accelerator used in the present invention are sulfene amide-types, thiazole-types, guanidine-types and aldehyde.amine/ammonia-types. The amount thereof is preferably 0.5 to 7 parts by weight based on 100 parts by weight of the rubber component. The lower limit of the amount of the vulcanization accelerator is preferably 1 part by weight and the upper limit of the amount is preferably 2.5 parts by weight. When the amount of the vulcanization accelerator is less than 0.5 part by weight, productivity tends to worsen significantly, as the vulcanization rate is slow and the time required for vulcanization becomes too long. When the amount is more than 7 parts by weight, the vulcanization rate is too fast and rubber scorching occurs when mixing and extruding the rubber, thereby causing many problems in the processes.

Besides each of the above components, the rubber component, carbon black, silica and oil, the rubber composition of the present invention can accordingly contain compounding agents that are added to the usual rubber composition, such as wax, an antioxidant, stearic acid, zinc oxide and sulfur.

The rubber composition of the present invention is obtained by kneading the rubber component, carbon black, silica, oil and, when necessary, other compounding agents using the usual processing equipment, such as a roll, a banbury mixer or a kneader.

The hardness of the rubber composition of the present invention measured at 25° C. by a JIS-A hardness meter is preferably 65 to 85. The lower limit of the hardness is more preferably 68, further preferably 70. The upper limit of the hardness is more preferably 80, further preferably 77. When the hardness of the rubber composition is lower than 65, block stiffness is insufficient and gripping performance tends to be insufficient due to collapse of the blocks. When the hardness is higher than 85, gripping performance tends to be insufficient as the rubber lacks flexibility.

The complex elastic modulus (E*) of the rubber composition of the present invention measured at 70° C. under initial strain of 10% and dynamic strain of 2% is preferably 5.0 to 25.0. The lower limit of E* is more preferably 7.0, further preferably 10.0. The upper limit of E* is more preferably 20.0, further preferably 18.0. When E* is lower than 5.0, steering response is slow and steering performance tends to decrease. When E* is higher than 25.0, impact absorbency of the entire tire is lost and stable grounding and steering stability tend to be lost.

The loss tangent (tan δ of the rubber composition of the present invention measured at 70° C. under initial strain of 10% and dynamic strain of 2% is preferably 0.25 to 0.45. The lower limit of tan δ is more preferably 0.28, further preferably 0.30. The upper limit of tan δ is more preferably 0.43. When tan δ is lower than 0.25, the energy loss that accompanies deformation of the blocks is insufficient and gripping performance tends to be insufficient. When tan δ is higher than 0.45, friction due to deformation of the blocks is large and acceleration tends to be slow.

The rubber composition of the present invention is used for a competition tire. In a competition tire, the ratio of blocks, which are at least 15 mm high, to land is about 23% and the rubber composition is required to have high hardness and stiffness, as the load applied to each block is large.

The competition tire of the present invention is prepared by kneading the rubber by a banbury or kneader, extruding the kneaded rubber into boards using an extruder, fitting the extruded rubber together with rubber-coated fabric and wire cords, which become the bead, and then, heating in a metal die.

The materials used in Example 1 and Comparative Example 1 are described below.

SBR: Tufdene™ (R) 4350 available from Asahi Kasei Chemicals Corporation (styrene content: 39%, vinyl content: 40%)

BR: UBEPOL-BR 150B available from Ube Industries, Ltd.

Carbon black: Carbon black having $N_2SA$ of 180 $m^2/g$, CTAB-adsorbing specific surface area of 160 $m^2/g$ and 24M4DBP of 102 ml/100 g Silica: Nipsil AQ available from Nippon Silica Co., Ltd.

Oil: Diana Process Oil AH-24 available from Idemitsu Kosan Co., Ltd.

Wax: SUNNOC WAX available from Ouchi Shinko Chemical Industrial Co., Ltd.

Antioxidant: SANTOFLEX 13 available from FLEXSYS CO.

Stearic acid: KIRI available from NOF Corporation

Zinc oxide: Zinc Oxide Type 2 available from Mitsui Mining and Smelting Co., Ltd.

Silane coupling agent: Si69 available from Degussa Co.

Sulfur: Sulfur available from Karuizawa Seirensho Kabushiki Kaisha.

Vulcanization accelerator: Nocceler CZ available from Ouchi Shinko Chemical Industrial Co., Ltd.

Vulcanization accelerator: Nocceler D available from Ouchi Shinko Chemical Industrial Co., Ltd.

EXAMPLE 1 AND COMPARATIVE EXAMPLE 1

According to the composition shown in Table 1, the materials other than sulfur and the vulcanization accelerator were kneaded using a banbury mixer. Then, sulfur and the vulcanization accelerator were added and the mixture was kneaded using an 8-inch roll. Thereafter, rubber samples were prepared using the obtained rubber composition and the following tests were conducted for the obtained samples. The results are shown in Table 1.

Hardness (JIS-A)

The hardness of the obtained rubber composition was measured using a JIS-A hardness meter at 25° C. and 0° C.

Viscoelasticity (VES)

The complex elastic modulus (E*) and the loss tangent (tan δ) were measured using a viscoelasticity spectrometer made by Iwamoto Corporation at 70° C. under initial strain of 10% and dynamic strain of 2%. The larger the E* value is the higher the stiffness and the better the steering stability. Also, the lower the tan δ value is the lower the possibility of heat generation.

Evaluation of Steering Stability

A tire was prepared using the rubber composition of the present invention and the steering stability thereof was evaluated. The obtained tire was mounted on Honda CR 250 and then run on an outdoor motocross course. The tire was evaluated by sensory evaluation on a scale of 1 to 5 rating 5 as the highest.

The lap time was obtained by measuring the time taken to run one lap using a stopwatch. After running, chipping of the blocks of the tire was evaluated.

TABLE 1

| | | Ex. 1 | | Com. Ex. 1 | |
|---|---|---|---|---|---|
| Composition (parts by weight) | | | | | |
| S-SBR | | 85 | | 85 | |
| BR | | 15 | | 15 | |
| Carbon black | | 50 | | 80 | |
| Silica | | 30 | | — | |
| Oil | | 35 | | 35 | |
| Wax | | 3.0 | | 3.0 | |
| Antioxidant | | 3.0 | | 3.0 | |
| Stearic acid | | 3.0 | | 3.0 | |
| Zinc oxide | | 2.5 | | 2.5 | |
| Silane coupling agent | | 2.0 | | — | |
| Sulfur | | 1.35 | | 1.35 | |
| Vulcanization accelerator CZ | | 1.7 | | 1.7 | |
| Vulcanization accelerator DPG | | 0.5 | | — | |
| Properties | | | | | |
| Hardness | 25° C. | 73 | | 73 | |
| | 0° C. | 79 | | 81 | |
| VES | E* | 7.4 | | 7.7 | |
| | Tanδ | 0.30 | | 0.35 | |
| Steering stability | | Lap 1 | Lap 3 | Lap 1 | Lap 3 |
| Side grip | | 3.3 | 3.5 | 3.0 | 3.5 |
| Traction | | 3.3 | 3.5 | 3.0 | 3.5 |
| Braking | | 3.3 | 3.5 | 3.0 | 3.5 |
| Lap time | | 2'3"42 | 2'2"04 | 2'4"01 | 2'1"95 |
| Chipping of blocks after running | | about ⅓ of Com. Ex. 1 | | | |

From comparing Example 1 and Comparative Example 1, it can be seen that steering stability immediately after starting is improved and lap time is shortened in Example 1. Also, abrasion resistance is favorable.

According to the present invention, in motocross competitions, lap time is shortened by improvement in side grip performance, traction performance and braking performance. Particularly, performance under low temperature conditions in winter and performance until the temperature increase of the tire is stabilized are improved.

What is claimed is:

1. A motocross competition tire having a ratio of blocks to land of about 23%, wherein said blocks are at least 15 mm high, said tire comprising rubber composition comprising:

10 to 100 parts by weight of carbon black having nitrogen-adsorbing specific surface area of 160 to 300 $m^2/g$, and 15 to 70 parts by weight of an oil, based on 100 parts by weight of a rubber component comprising 20 to 95% by weight of a styrene butadiene copolymer rubber having styrene content of at least 30% and vinyl content of at least 30% and 5 to 80% by weight of butadiene rubber, and silica in an amount of 20 to 100% by weight of said carbon black;

wherein the total amount of said carbon black and said silica is 20 to 120 parts by weight, the hardness is 65 to 85, the complex elastic modulus is 5.0 to 25.0 and the tangent loss is 0.25 to 0.45.

2. The motocross competition tire comprising the rubber composition of claim 1, wherein the carbon black is present in an amount of 50 to 90 parts by weight and has a nitrogen-absorbing specific surface area of 170 to 250 $m^2/g$.

3. The motocross competition tire comprising the rubber composition of claim 1, wherein the carbon black is present in an amount of 60 to 80 parts by weight and has a nitrogen-absorbing specific surface area of 170 to 220 $m^2/g$.

4. The motocross competition fire of claim 1, wherein the silica has a BET specific surface area of 80 to 270 $m^2/g$.

5. The motocross competition tire of claim 2, wherein the silica has a BET specific surface area of 80 to 270 $m^2/g$.

6. The motocross competition fire of claim 3, wherein the silica has a BET specific surface area of 80 to 270 $m^2/g$.

* * * * *